Jan. 1, 1935.  J. H. ALLISON  1,986,179
SEPARATOR
Filed May 17, 1933   2 Sheets-Sheet 1
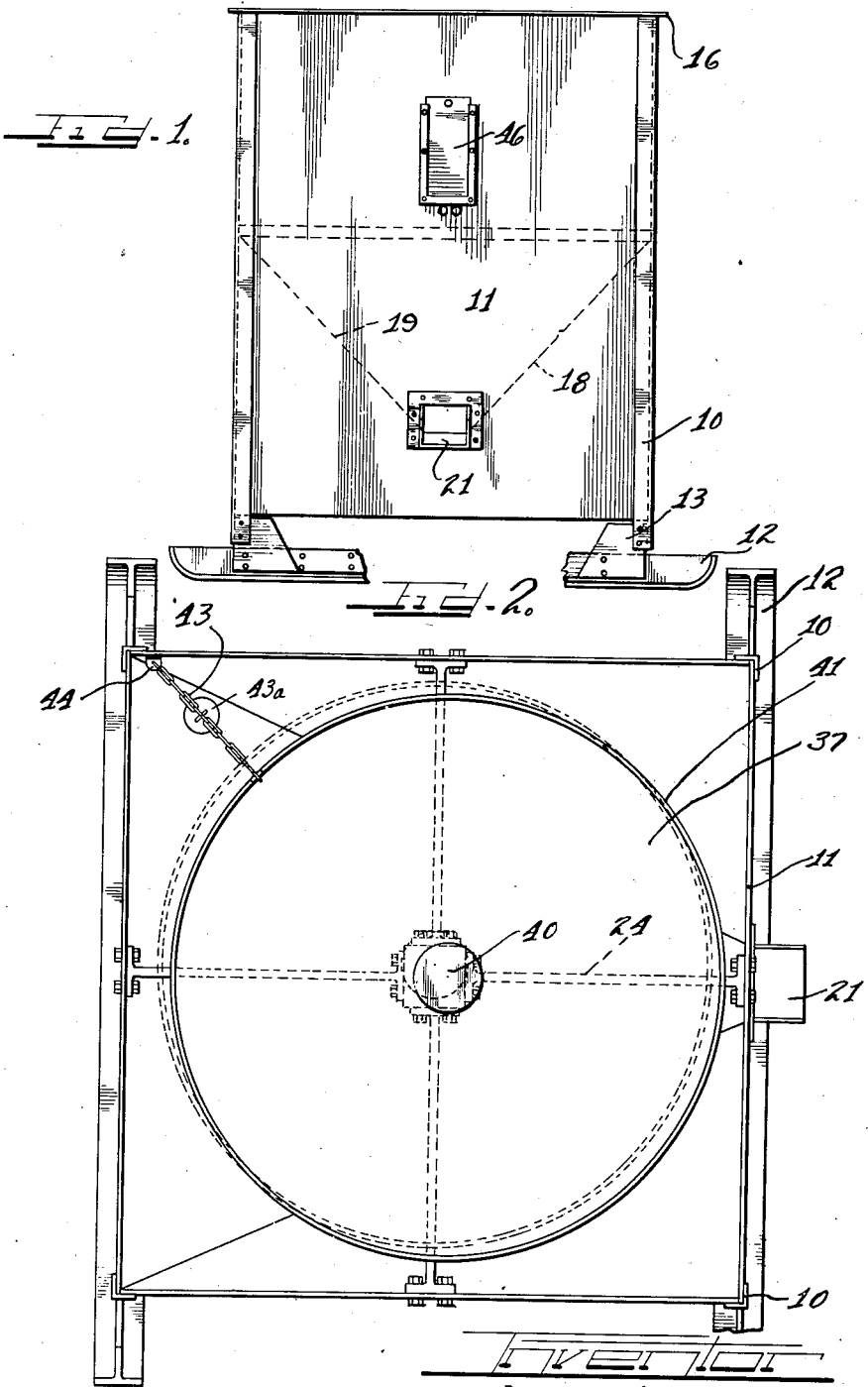
Inventor
Jesse H. Allison.
by Charles O. Wills Attys.

Jan. 1, 1935.  J. H. ALLISON  1,986,179
SEPARATOR
Filed May 17, 1933  2 Sheets-Sheet 2

Fig. 3.

Inventor
Jesse H. Allison.
by Charles O'Neill Attys.

Patented Jan. 1, 1935

1,986,179

UNITED STATES PATENT OFFICE 1,986,179

SEPARATOR

Jesse H. Allison, El Paso, Tex.

Application May 17, 1933, Serial No. 671,433

3 Claims. (Cl. 209—446)

This invention relates to an improved separator of a new type for separating the lighter and heavier particles of a comminuted material. While the device of this invention finds particular use in the separation of placer gold and other metals from sand and gravel, by concentration, it will be apparent to one skilled in the art that the device is adapted for use in other fields for purposes of like nature, and is not necessarily limited to the particular field mentioned above.

To this end, the present invention seeks to provide a separator of the character described which is simple in design, efficient in operation, which may be manufactured at a low relative cost, and of such construction that a portable or stationary device may be provided without sacrificing any of the desirable features thereof.

It is a further object to provide a device for separating gold, silver and other metals from comminuted material, sand and the like, which may be operated for relatively long periods of time without having its efficiency impaired by the parts becoming ineffective.

It is a further object of the invention to provide a device of this character in which the material to be separated is subjected to the action of vibratory means in such a manner as to cause the lighter particles of the material to be moved away from the heavier particles and discharged.

It is also an object to provide a device of this nature wherein the material to be separated is fed into the device by a hopper arrangement, and in which the discharge of material from the hopper is facilitated by the operation of the separating instrumentalities.

In accordance with the general features of this invention, I propose to provide a vertically disposed rotatable shaft carrying a crank on its upper end and provide a pan or basin which is removably affixed to and carried by this crank. Movement of the crank causes the pan to be agitated or vibrated with a gyratory movement. The pan or basin is provided with a bottom which is upwardly flared from the crank support to its outer periphery where an upstanding flange is provided. With this arrangement, material to be separated, when placed in the pan, will be agitated and the lighter particles thereof will move outwardly and be discharged over the upstanding flange, whereas the heavier particles of metalliferous matter will move downward in their travel to the bottom of the pan and accumulate at its deepest portion. The pan may be easily removed from the crank to empty it of its contents.

As an additional feature, a hopper is provided for feeding the material to be separated into the pan. This pan is provided with a central hub at its support, which projects above the bottom of the pan, the upper end of the hub being disposed in the discharge opening of the hopper. Since the hub and pan move as a unit with a gyratory motion, the discharge of the material from the hopper into the pan is greatly facilitated and aided by the hub.

Other objects and features of this invention will more fully appear from the following detail description taken in connection with the accompanying drawings which illustrate a single embodiment thereof, and in which Figure 1 is a view in elevation, taken on the discharge side of a device embodying the features of this invention;

Figure 2 is a plan view of the device, the hopper being removed to disclose the vibratable pan or basin; and Figure 3 is an enlarged vertical sectional view showing the operative relationship of the various parts of the device.

As shown on the drawings:

In the illustrated embodiment of this invention, there is shown on the drawings, a frame structure including corner posts 10 of angle iron which are disposed at the four corners of a square housing. Extending between these corner posts, the side walls of the housing are formed by plate members 11 secured along their lateral edges by bolts, welding or other suitable means to the corner posts. The lower ends of the corner posts project below the lower edges of the housing walls and define supporting feet to which runners or skids 12 are connected by gussets 13 which enable the separator to be conveniently and readily moved from one location to another. In practice, I have found it desirable to construct these runners of T-beams which may be secured with the central rib uppermost and curved at their ends.

The upper end of the housing is open to receive a hopper 14 therein. The bottom of this hopper is outwardly and upwardly flared from a central discharge opening 15 to its outer periphery which terminates in a peripheral flange 16 which engages the upper edges of the housing side walls to support the hopper in position.

Secured to the side walls of the housing between their upper and lower edges is a slanting bottom 17 having flared or angularly disposed side portions 18 and 19, as shown in Figure 1, which converge at a discharge opening 20 in one wall of the housing. Extending outwardly from this opening is a discharge spout 21.

A vertically disposed bearing is supported centrally of the housing in a bearing bracket generally indicated at 23, which is provided with a plurality of radially extending arms 24 having their outer ends secured to the walls of the housing by bolts 25. This bearing projects at its lower end through the bottom 17 and rotatably supports a shaft 26.

The shaft 26 is driven through a set of beveled gears 27 and 28, the former being secured to the shaft 26 and the latter being secured for rotation with a countershaft 29. The shaft 29 is supported in end bearings 30 and 31 and carries a gear 32 which may be driven by any suitable source of power. Obviously, the gear 32 could be replaced by a pulley if desired or the shaft 29 might be directly coupled to the power means. The bearings 30 and 31 are supported upon a base 32 having its ends connected to the runners. In this arrangement, the driving mechanism for the shaft 26 is disposed below the bottom 17 and is thereby protected from dust, gravel and the like.

The upper end of the rotatable shaft 26 is provided with an offset arm 33 defining a crank. The outer end of this arm is threaded to receive a nut 34 by means of which a bearing member 35 is retained against axial movement of the crank arm but may rotate relative thereto.

A hub 36 of a pan or basin generally indicated at 37 slidably fits the bearing member 35. The bearing member and hub are respectively provided with abutment flanges 38 and 39 at their bottoms, the hub being retained against removal from the bearing member merely by virtue of the weight of the hub and pan associated therewith. The upper end of the hub is provided with a cap 40 which extends over the bearing and nut 34, thereby protecting these parts against gravel, dirt and the like which would soon cause the parts to wear out.

The pan or basin 37 is flared outwardly and upwardly from the lower end of the hub 36, and at its periphery is provided with an annular flange 41 which extends above and below the peripheral edge of the pan.

It will be observed that the upper end of the hub is disposed in the discharge opening 15 of the hopper. With this arrangement, when the shaft 26 is revolved, the crank 33 causes the hub and pan associated therewith to move with a gyratory motion. This movement of the hub in the opening 15 greatly facilitates the discharge of material to be separated from the hopper, and keeps the material loose and free so that it will enter the pan without fouling.

Since the pan is supported for turning movement relative to the crank arm 33, there would be a tendency of the pan to revolve about the crank arm during the operation of the separator. To overcome this condition a lug 42 is provided on one side of the pan and connected by a chain 43 carrying a weight 43a to a bracket secured to the side of the housing. This chain enables the pan to gyrate but maintains the pan against rotation around the crank arm 33.

The vibration or gyratory movement of the pan 37 causes the material deposited therein to be vigorously vibrated. This action causes the metalliferous or heavier particles of the material to settle at the center of the pan around the hub portion, whereas the lighter particles of material will move away from the hub portion and be carried over the upper edge of the annular flange 41. Since this flange is inwardly spaced from the housing, the particles passing over the flange will fall to the bottom 17 and be discharged from the spout 21. The heavier particles may be easily recovered by removing the hopper which provides access to the pan 37 which may then be removed from the bearing 35, the chain 43 first having been detached. Although the pan containing the heavier particles of material may be easily emptied, it will be observed that the separating instrumentalities are so constructed and operate in such a manner that the device may, if desired, be operated for several days without unloading. In order that an operator may ascertain whether the mechanism is functioning properly and determine when the pan has become sufficiently filled with heavier particles to warrant emptying the same, a plurality of observation openings 45 are provided in the housing. These openings are ordinarily kept closed by means of sliding doors 46 or other suitable means.

The annular flange 41 is extended below the bottom of the pan 37 for the reason that there are times when water may be used to wash the gravel. Therefore, any water which may flow over the top edge of the flange 41 will drip off the lower edge of the flange and will not be carried along the bottom of the pan to the bearing portions of the machine.

From the foregoing description, it will be apparent that this invention provides an improved separator which is admirably adapted for use in a portable or stationary device; a separator which is so constructed that the action of the separator instrumentalities facilitates the discharge of the material from the hopper; which is simple in construction, efficient in operation; and which may be operated over a long period of time without its efficiency becoming impaired or its parts being rendered ineffective.

Now, it is of course, to be understood that although I have described in detail the preferred embodiment of my invention, the invention is not to be thus limited but only in so far as defined by the scope and spirit of the appended claims.

I claim as my invention:

1. In a device of the character described, a hopper having a downward discharge opening, a vertically disposed rotatable shaft, a crank at the upper end of the shaft revoluble in the path of the discharge from said opening, whereby the material passing thru the discharge opening is agitated, a pan under the hopper to receive the discharge therefrom, said pan being supported on said crank and having a bottom sloping downwardly from its periphery to its support, means to maintain said pan against rotational movement, and means to drive said shaft, whereby the crank causes the pan to move with a gyratory motion.

2. A separator comprising a housing having a bottom and side walls defining an open top, an outlet at the bottom of the housing, a removable cover for the housing shaped to define a hopper having a downward discharge opening for material placed therein, a crank supported within said housing contiguous said opening, said crank being revoluble about a vertical axis and operative to stir the material adjacent said opening to facilitate its discharge, means supported on said crank and actuated thereby, said means having parts operable in such a manner as to separate out and cause a portion of the discharge from said hopper to pass into the bottom of the housing.

3. A separating device comprising a housing having an open top and outlet adjacent its bottom, a hopper forming a cover for the housing, said hopper having a central discharge opening for material placed therein, crank means disposed directly below said opening and revoluble about a vertical axis, said crank being operative to agitate the material at said opening, a separator pan carried by said crank disposed to receive material discharged from the hopper, flexible means interconnecting said pan and housing, whereby rotation of the pan is prevented, and means to drive said crank.

JESSE H. ALLISON.